(12) United States Patent
Lee (10) Patent No.: US 9,036,218 B2
(45) Date of Patent: *May 19, 2015

(54) SCANNER AND IMAGE FORMING APPARATUS HAVING THE SAME THAT REDUCES THE TILTING OF A MOVING UNIT

(71) Applicant: SAMSUNG ELECTRONICS CO., LTD., Suwon-si, Gyeonggi-do (KR)

(72) Inventor: Seung-jae Lee, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/972,191

(22) Filed: Aug. 21, 2013

(65) Prior Publication Data

US 2013/0333494 A1  Dec. 19, 2013

Related U.S. Application Data

(63) Continuation of application No. 12/472,460, filed on May 27, 2009, now Pat. No. 8,570,612.

(30) Foreign Application Priority Data

Jun. 27, 2008  (KR) ........................ 10-2008-0061769

(51) Int. Cl.
*H04N 1/04* (2006.01)
*H04N 1/46* (2006.01)
(Continued)

(52) U.S. Cl.
CPC ............. *F16H 19/04* (2013.01); *H04N 1/1017* (2013.01); *H04N 1/1021* (2013.01)

(58) Field of Classification Search
USPC .................. 358/474, 497, 494, 1.5, 505, 413;
74/422, 29, 30, 425, 24, 89, 501.6,
74/89.32, 89.34, 89.11, 89.14, 89.16, 103,
74/458, 498, 507, 842; 359/17, 197.1,
359/200.3, 202.1, 220.1, 226.1, 230, 299,
359/315, 362, 363, 292, 142
See application file for complete search history.

(56) References Cited

U.S. PATENT DOCUMENTS 3,384,814 A   5/1968  Stinehelfer
3,965,757 A   6/1976  Barrus
(Continued)

FOREIGN PATENT DOCUMENTS

JP   2001-56514 A   2/2001
JP   2008-15331 A   1/2008

OTHER PUBLICATIONS

U.S. Appl. No. 03/965,757, filed Jun. 1976, Barrus, Donald Martin.
(Continued)

*Primary Examiner* — Ngon Nguyen
(74) *Attorney, Agent, or Firm* — Staas & Halsey LLP (57) ABSTRACT

Disclosed are a scanner and an image forming apparatus including the same. The scanner may include a scanner unit; a support unit configured to support the scanning unit; a first pinion rotatably disposed on the support unit and configured to move along a first rack of a first surface of a guide member; and a second pinion rotatably disposed on the support unit and configured to move along a second rack of a second surface of the guide member such that the direction of rotation of the second pinion is opposite to the direction of rotation of the first pinion, the second surface of the guide member being different from the first surface of the guide member.

11 Claims, 8 Drawing Sheets

(51) Int. Cl.
*F16H 19/04* (2006.01)
*H04N 1/10* (2006.01)

(56) References Cited

U.S. PATENT DOCUMENTS

| | | | | |
|---|---|---|---|---|
| 4,861,306 | A | * | 8/1989 | Bolli et al. .................. 446/90 |
| 7,529,001 | B2 | * | 5/2009 | Takahara .................. 358/474 |
| 2004/0006361 | A1 | | 1/2004 | Boyle et al. |
| 2004/0012823 | A1 | * | 1/2004 | Hendrix et al. ............ 358/474 |

OTHER PUBLICATIONS

Wikipedia Encyclopedia, Rack Rail, Dec. 2007, Wikipedia Encyclopedia, all pages.
KMODDL, Helical Rack and Pinion, 2005, KMODDL, all pages.
Korean Office Action issued Jul. 24, 2012 in corresponding Korean Patent Application No. 10-2008-0061769.
Office Action dated Jun. 28, 2013 in U.S. Appl. No. 12/472,460.
Wikipedia Encyclopedia, Gear, Apr. 2007, Wikipedia Encyclopedia, all pages.
Wikipedia Encyclopedia, Torque, Jul. 2007, Wikipedia Encyclopedia, all pages.
Office Action dated Nov. 20, 2012 in U.S. Appl. No. 12/472,460.
Advisory Action dated Mar. 12, 2013 in U.S. Appl. No. 12/472,460.
Notice of Allowance dated May 16, 2013 in U.S. Appl. No. 12/472,460.

* cited by examiner

SCANNER AND IMAGE FORMING APPARATUS HAVING THE SAME THAT REDUCES THE TILTING OF A MOVING UNIT

CROSS-REFERENCE TO RELATED APPLICATION

This application is a continuation application of application Ser. No. 12/472,460, filed May 27, 2009, which is now pending, and is related to, and claims priority to Korean Patent Application No. 10-2008-0061769, filed on Jun. 27, 2008 in the Korean Intellectual Property Office, the entire disclosures of which are incorporated herein by reference.

TECHNICAL FIELD

The present disclosure generally relates to a scanner and an image forming apparatus having the same, and more particularly, to a moving unit for a scanner, a scanner and an image forming apparatus that reduces the tilting of a moving object.

BACKGROUND OF RELATED ART

Generally, an image forming apparatus scans a document, and stores image data associated with the image of that document. An image forming apparatus can also reproduce the stored image data on a printing medium. An image forming apparatus can includes an electric copier, a printer, a scanner, a facsimile, or a multifunction device that integrates one or more of the functions of the afore-mentioned.

An image forming apparatus can include a scanning module that scans one or more images from a document, and/or an ink cartridge that is used to reproduce the scanned image by printing an ink image on a printing medium. In such an image forming apparatus, it may be desirable to reciprocate the scanning module and/or the ink cartridge in certain direction, and a belt type and/or a rack and pinion type can be employed to such end.

When a rack and pinion type is used, the moving object, such as the scanning module or the ink cartridge, for example, may have a tendency to tilt as the pinion rotates, which tilting may adversely affect the scanned image and/or the print quality.

SUMMARY OF THE DISCLOSURE

The foregoing and/or other aspects of the present disclosure can be achieved by providing a scanner having a scanning unit, a support unit, a first pinion, and a second pinion. The support unit can be configured to support the scanning unit. The first pinion can be rotatably disposed on the support unit and can be configured to move along a first rack of a first surface of a guide member. The second pinion can be rotatably disposed on the support unit and can be configured to move along a second rack of a second surface of the guide member such that the direction of rotation of the second pinion is opposite to the direction of rotation of the first pinion. The second surface of the guide member can be different from the first surface of the guide member.

The second pinion can be configured to rotate such that a moment of rotation caused by the rotation of second pinion has the same magnitude and is opposite in direction to a moment of rotation caused by the rotation of the first pinion.

The first pinion and the second pinion can have substantially the same pitch. At least one of the first pinion and the second pinion includes a helical gear.

The first surface and the second surface of the guide member can be opposite from each other, or can be opposite and offset (e.g., stepped) from each other.

The scanner having the scanning unit can further include a driving source configured to rotate at least one of the first pinion and the second pinion.

The foregoing and/or other aspects of the present disclosure can be achieved by providing a scanner that includes a scanning unit, a support unit, a first pinion, and at least one of a rolling contact member and a sliding contact member. The support unit can be configured to support the scanning unit. The first pinion can be rotatably disposed on the support unit and can be configured to move along a first rack of a first surface of a guide member. The rolling contact member can be rotatably disposed on the support unit and can be configured to contact a second surface of the guide member. The sliding contact member can be disposed on the support unit and can have a substantially circular arc shape to slidingly contact the second surface of the guide member. The second surface of the guide member can be different from the first surface of the guide member.

The scanner can further include an elastic member that is configured to elastically move at least one of the rolling contact member and the sliding contact member in a direction of the guide member to contact the guide member.

The foregoing and/or other aspects of the present disclosure can be achieved by providing an image forming apparatus that includes a scanner and an image forming unit. The scanner can have a scanning unit, a guide member, a support unit, a first pinion, and a second pinion. The guide member can include a first surface having a first rack and a second surface having a second rack. The first surface of the guide member can be different from the second surface of the guide member. The support unit can be configured to support the scanning unit. The first pinion can be rotatably disposed on the support unit and can be configured to move along the first rack of the first surface of the guide member. The second pinion can be rotatably disposed on the support unit and can be configured to move along the second rack of the second surface of the guide member, a rotation direction of the second pinion being opposite to a rotation direction of the first pinion.

The image forming unit can be configured to reproduce an image scanned by the scanning unit on a printing medium.

BRIEF DESCRIPTION OF THE DRAWINGS

Various features and advantages of the disclosure will become more apparent by the following detailed description of several embodiments thereof with reference to the attached drawings, of which.

DETAILED DESCRIPTION OF SEVERAL EMBODIMENTS

Reference will now be made in detail to embodiments of the present invention, examples of which are illustrated in the accompanying drawings, wherein like reference numerals refer to like elements. While the embodiments are described with detailed construction and elements to assist in a comprehensive understanding of the various applications and advantages of the embodiments, it should be apparent however that the embodiments can be carried out without those specifically detailed particulars. It should be also noted that in the drawings, the dimensions of the features are not intended to be to true scale and may be exaggerated for the sake of allowing greater understanding.

A scanner moving unit and an image forming apparatus according to various embodiments will be described by referring to the accompanying figures. As an example of an image forming apparatus, a scanner with a scanning module in turn being an example of the a moving object is described. It should thus be understood that the following description will be applied to other moving objects, for example, an ink cartridge, of any other types of image forming apparatus.

Figure 1:
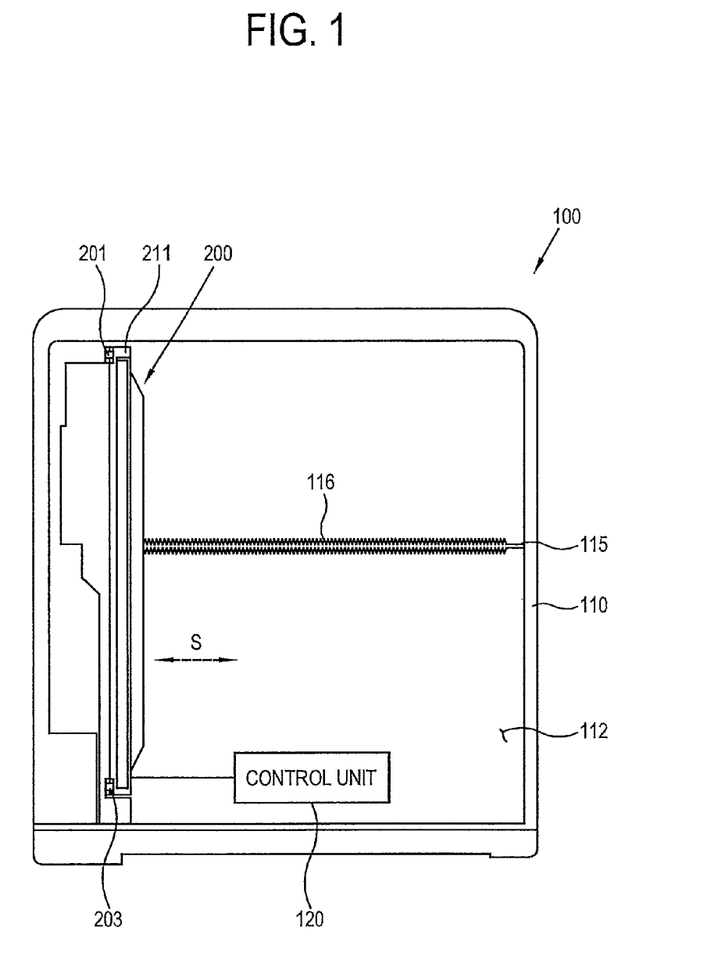
FIG. 1 is a schematic plane view of a scanner, according to an embodiment.

FIG. 1 is a plane view of a scanner 100 according to an embodiment. In FIG. 1, the platen on which the document to be scanned is typically placed for scanning has been omitted to illustrate the inner configuration of the scanner 100.

Figure 2:
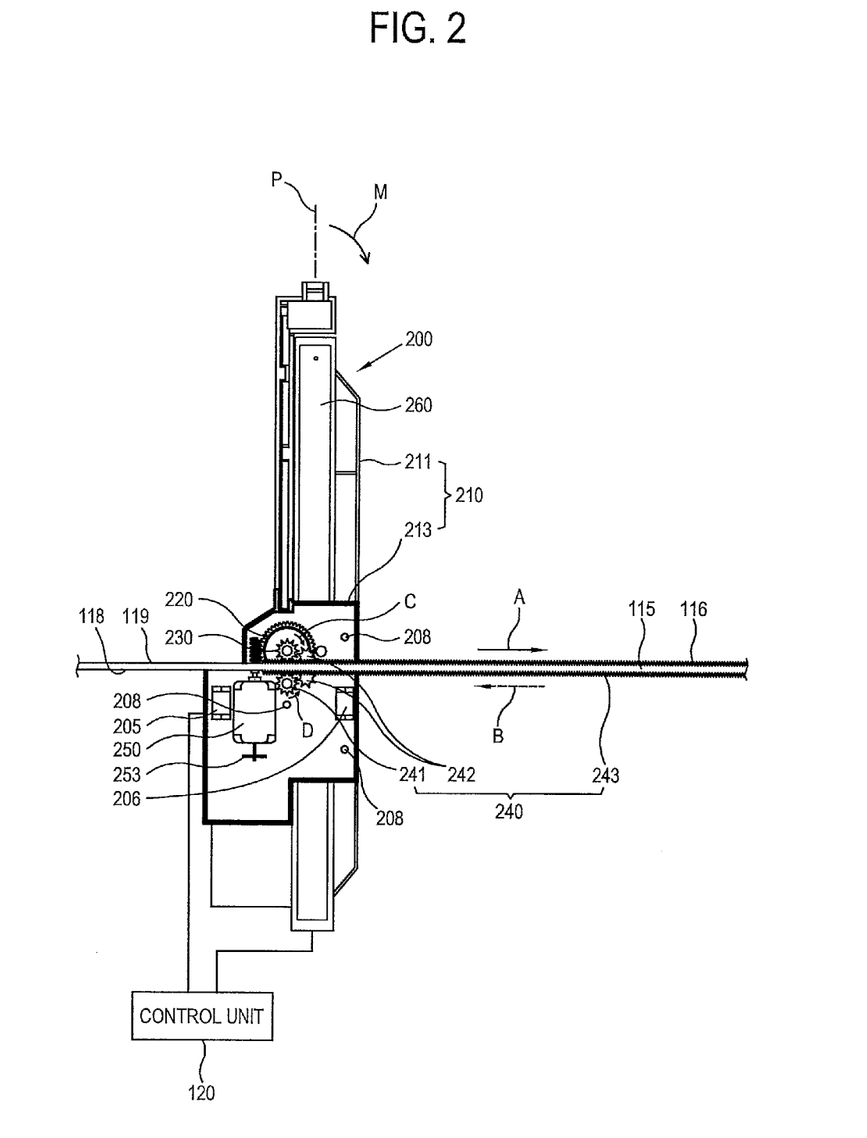
FIG. 2 is a rear view of the scanner in FIG. 1.

FIG. 2 is a view from the rear of the scanner 100 shown in FIG. 1, of which the main body frame 110 is omitted to illustrate the configuration of a moving unit 200.

As shown in FIGS. 1 and 2, the scanner 100 includes a main body frame 110, a guide member 115 extending in a scanning direction S, the moving unit 200 that is configured to move a scanning module 260 along the guide member 115, and the scanning module 260 mounted to the moving unit 200.

The guide member 115 is disposed on the main body frame 110 in such a manner as to be held stationary. A first surface 119 of the guide member 115 includes a first rack 116. According to an embodiment, the guide member 115 may be a single guide member as shown in FIGS. 1 and 2, however, more than one guide member 115 can be used. For example, the guide member 115 can include multiple guide members such that the first rack 116 can be formed on one of the multiple guide members, and a second rack 243 can be formed on another one of the multiple guide members.

The scanning module 260 can include an image sensor such as a contact image sensor (CIS) or a charge coupled device (CCD) sensor, for example.

A platen made of a glass material is disposed on an upper portion of the main body frame 110. Moreover, the main body frame 110 is configured to have the moving unit 200 disposed therein.

The moving unit 200 may include a unit frame 210, on which the scanning module 260 is mounted, a first pinion 220 disposed on the unit frame 210 so as to rotate and move along the first rack 116 and a tilt prevention unit 240.

The unit frame 210 includes an upper frame 211 and a lower frame 213. The scanning module 260 is disposed between the upper frame 211 and the lower frame 213 of the unit frame 210. The scanning module 260 is coupled to the unit frame 211 and to the unit frame 213 by at least a coupling means 208. Other known mounting or coupling structures, means, or methods can be used instead of the coupling means 208 to mount or couple the scanning module 260 to the unit frame 210.

FIG. 1 shows upper rollers 201 and 203 as being disposed on opposite ends of the upper frame 211 of the unit frame 210 and are configured to move or roll along in the scanning direction S. FIG. 2 shows, disposed on the lower frame 213 of the unit frame 210, the lower rollers 205 and 206, which are configured to move or roll along the scanning direction S on the base surface 112 of the main body frame 110. The lower rollers 205 and 206 are configured to elastically press the unit frame 210 in the direction of the platen (not shown) such that a force is exerted on the upper rollers 201 and 203 to contact the platen.

The tilt prevention unit 240 is configured to contact the guide member 115 to reduce the tilting of the unit frame 210 that may result from the rotation of the first pinion 220. The tilt prevention unit 240 in the scanner 100 may include the second rack 243, which is made or disposed on a second surface 118 of the guide member 115, a second pinion 241 configured to rotate and move along the second rack 243, and an idle gear 242 configured to transmit or transfer a rotation force associated with the first pinion 220 to the second pinion 241.

According to an embodiment, as shown in FIG. 2, the second surface 118, on which the second rack 243 is formed or disposed, is the surface of the guide member 115 opposite the first surface 119.

The second pinion 241 is disposed on the unit frame 210 of the moving unit 200 to reduce the rotational moment that is produced by the rotation of the first pinion 220. The idle gear 242 receives the rotation force from the first pinion 220 and transfers the rotation force to the second pinion 241 such that the direction of rotation of the second pinion 241 is opposite to the direction of rotation of the first pinion 220.

The moving unit 200 can further include a driving source 250 disposed on the unit frame 210 and configured to drive or rotate the first pinion 220 and the second pinion 241 of the tilt prevention unit 240. In some embodiments, the driving source 250 can be disposed outside the moving unit 200 and the first pinion 220 can be configured to receive a rotation force from the driving source 250 from outside of the moving unit 200.

The driving source 250 may further include a direct current (DC) motor (not shown) and an encoder wheel 253 configured to detect a rotation number or speed of the DC motor. A worm gear 251 is disposed on a driving shaft of the driving source 250, as shown in FIG. 3, and the worm gear 251 is engaged to a gear 223 that is integrated with the first pinion 220 and configured to rotate with the first pinion 220.

As shown in FIG. 1, the scanner 100 can further include a control unit 120 configured to control the movement of the moving unit 200, and an interface unit (not shown). The interface unit is configured to receive a scanning command or instruction from a user or a host apparatus (not shown) and is further configured to produce a signal associated with the scanning command or instruction.

The interface unit can include a liquid crystal display (LCD) panel (not shown) and/or an input key (not shown). Moreover, the interface unit can include at least one of a universal serial bus (USB) port, a serial port, a parallel port, and a network interface card to receive and/or transmit signals associated with the scanning operation.

Figure 3:
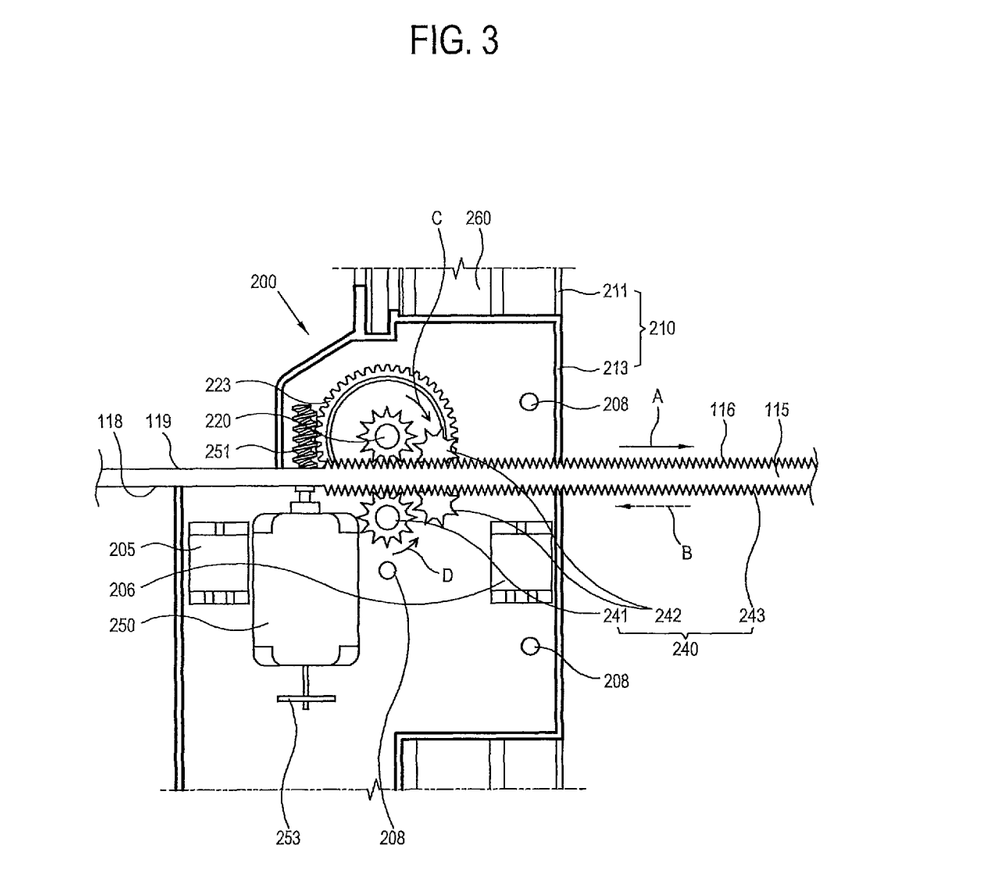
FIG. 3 is an enlarged view of the scanner in FIG. 1.

When a scanning command is received through the interface unit, the control unit 120 controls the driving source 250 of the moving unit 200 such that the moving unit 200 moves in a direction A (e.g., forward direction), as shown in FIG. 3, and the scanning module 260 scans an image of a document.

The process of moving the moving unit 200 in the direction A will be described in more in detail by referring to FIGS. 2 and 3.

Figure 4:
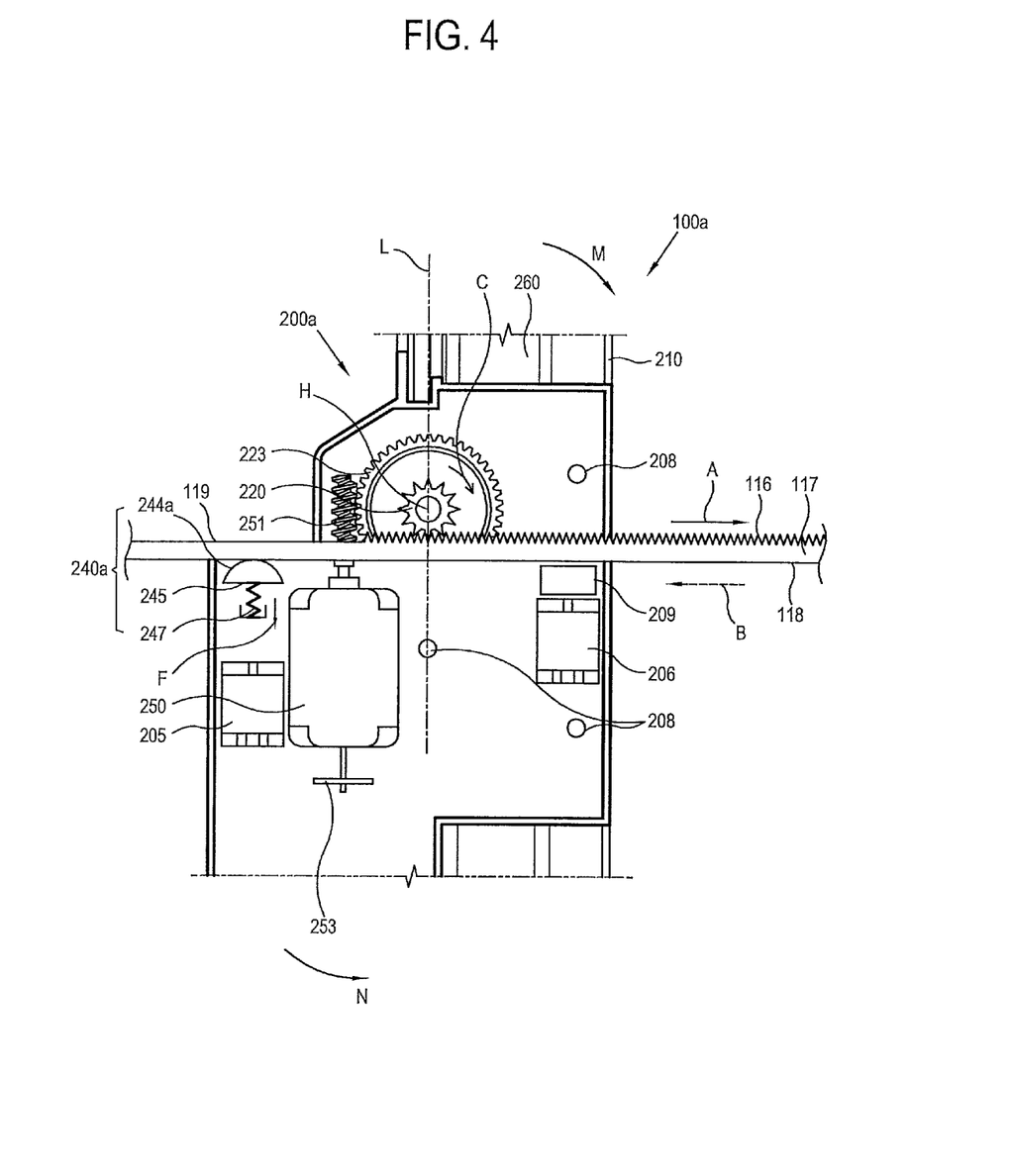
FIG. 4 is an enlarged view of a scanner according to an embodiment.

The first pinion 220 receives a driving force from the worm gear 251 disposed on the rotation shaft of the driving source 250 and rotates in a clockwise direction C. Concurrently, the second pinion 241 of the tilt prevention unit 240 rotates in a counterclockwise direction D, that is, the second pinion 241 rotates in the opposite direction to the rotation direction of the first pinion 220. FIG. 4 illustrates a rotation moment in a direction M that is exerted on the unit frame 210 as a result of the rotation of the first pinion 220 that is at least in substantial part offset by the rotation of the second pinion 241, thereby reducing the tilting of the unit frame 210.

When the amount or strength of the rotation moment that results from the rotation of the first pinion 220 is the same as the amount or strength of the rotation moment produced by having the second pinion 241 rotate in the opposite direction, it is possible to have the tilting angle of the unit frame 210 to be zero or substantially zero. According to one embodiment, the first pinion 220 and the second pinion 241 may have the same pitch.

Because the scanning module 260 can be prevented from tilting while moving during a scanning operation, the scanning module 260 can maintain a substantially perpendicular or normal position with respect to the scanning direction S, thereby improving the quality of the scanned image.

The second pinion 241 and the second rack 243 can have multiple shapes and/or sizes as long as the rotation moment M generated by the rotation of the first pinion 220 is offset by the rotation of the second pinion 241. For example, the first pinion 220 and the second pinion 241 can each have helical gear shapes.

When the control unit 120 detects that the moving unit 200 has moved in the direction A by a predetermined distance, the control unit 120 controls the driving source 250 to return the moving unit 200 to an original initial position P by, e.g., controlling the driving source 250 so that the direction of rotation of the driving shaft of the driving source 250 is reversed. In one embodiment, the predetermined distance can correspond to, for example, the length of a document to be scanned in the scanning direction S. In another embodiment, the predetermined distance can correspond to the length of the platen in the scanning direction S.

When the first pinion 220 rotates in a counterclockwise direction and the second pinion 241 rotates in a clockwise direction, the moving unit 200 moves in a direction B (e.g., backwards direction), and the rotation moment applied to the moving unit 200 by the first pinion 220 is offset partially or totally by the rotation of the second pinion 241 to prevent or minimize the tilting of the moving unit 200.

According to an embodiment, the first pinion 220 and the first rack 116, and the second pinion 241 and the second rack 243, can respectively have matching or similar shapes. In such embodiment, the rotation speeds of the first pinion 220 and the second pinion 241 are substantially similar or uniform and the rotation moments produced by the rotation of the first pinion 220 and the rotation of the second pinion can be offset to prevent the moving unit 200 from tilting, and thus allow the same to remain substantially perpendicular to the scanning direction S. Moreover, by using the exactly the same sizes and shapes for these components, the overall cost of manufacturing and/or maintenance of the scanner 100 can be reduced due to the compatibility of components.

The first pinion 220 and the second pinion 241 may be symmetrically disposed on opposite sides about the length of the guide member 115.

In the above-described embodiments, the second pinion 241 receives the driving force from the driving force 250 to rotate the second pinion 241. Alternatively, the second pinion 241 need not receive a driving force and can be idle when appropriate. In such embodiment, when the moving unit 200 moves in the direction A by the rotation of the first pinion 220, the second pinion 241 rotates in the opposite direction to the rotation direction of the first pinion 220 as a result of the friction that occurs between the second pinion 241 and the second rack 243 and in accordance with movement of the unit frame 210. Thus, the rotation moment produced by the rotation of the first pinion 220 can be partially or totally offset, thereby preventing or minimizing the tilting of the moving unit 200.

In the above-described embodiments, the scanning module 260 is an example of a moving object. Alternatively, an ink cartridge can be used in place of the scanning module 260 in an image forming apparatus that forms images using a moving ink cartridge. Moreover, it is also possible that the moving unit 200 may be another moveable unit configured to move for scanning an object, or for forming or producing an image on a printing medium.

As shown in FIG. 4, a scanner 100a of a second exemplary embodiment includes a guide member 117 and a moving unit 200a. The guide member 117 is disposed on a main body frame and is not shown, but can, be held stationary within the main body frame. The guide member 117 has a first surface 119 and a second surface 118. The first surface 119 includes a first rack 116 and the second surface 118 is configured to contact a sliding friction member 244a of the moving unit 200a.

In this embodiment, the moving unit 200a includes a tilt prevention unit 240a having the sliding friction member 244a and an elastic member 245.

The sliding friction member 244a is disposed on the unit frame 210, and is configured to contact the second surface 118 of the guide member 117. The position of the sliding friction member 244a is such that a rotation moment M caused by a clockwise movement of the first pinion 220 in the direction C can be reduced or offset.

The position of the sliding friction member 244a when the second surface 118 is on the opposite side of the first surface 119 will be described more in detail. As shown in FIG. 4, the sliding friction member 244a is positioned such that a central point G corresponding to the contact surface 244a on which the sliding friction member 244a and the second surface 118 contact each other can be placed or positioned on or left of the plane L as shown in FIG. 4. The plane L is perpendicular to the second surface 118 of the guide member 117, and includes the radial center point H of the first pinion 220. By using the sliding friction member 244a, and because scanning is performed when the moving unit 200 moves in the direction A, a tilting of the moving unit 200 that can occur during the scanning can be reduced.

In another embodiment, when the scanning occurs by having the moving unit 200 move in the direction B, the tilt prevention unit 240a can be disposed to the right side of the plane L.

By considering of the moving direction of the moving unit 200 in which an image that is recorded on a document is scanned, the moving unit 200 can be prevented from tilting during the scanning process. For example, a scanning module 260 of the moving unit 200 returns to the initial position P, as shown in FIG. 2, by moving in the direction B without scanning. As a result, even if tilting where to occur when the scanning module 260 moves in the direction B, the tilting will have no effect on the quality of a scanned image because there is no scanning taking place as the scanning module 260 returns to the initial position P.

The contact surface of the sliding friction member 244a that contacts the guide member 117 can have a curved shape or curved surface (e.g. a substantially circular arc) to reduce the amount of frictional forces that occur during contact between the sliding friction member 244a and the guide member 117 when the unit frame 210 moves. The shape of the sliding friction member 244a need not be limited to a curved surface but may be of any shape that can be used to reduce friction between the sliding friction member 244a and the guide member 117.

Moreover, the surface of the sliding friction member 244a can be coated with a thin layer of material, such as Teflon or other like material, that is known to reduce the effects of friction and/or that can increase a wear-resistance of the surface of the sliding friction member 244a.

The elastic member 245 is a device (e.g., a spring) that elastically presses or pushes the sliding friction member 244a in the direction of the guide member 117 to make contact with the guide member 117.

The moving unit 200a can include a guide piece 209 separated from the second surface 118 of the guide member 117 by a predetermined distance. The guide piece 209 is configured to prevent the moving unit 200a from separating from the guide member 117. While a counterclockwise direction rotation moment is produced or exerted on the moving unit 200a when the moving unit 200a moves in the direction B, the guide piece 209 contacts to the second surface 118 of the guide member 117 to restrict the amount (e.g., angle) of tilting of the moving unit 200a in the counterclockwise direction that is produced by the counterclockwise direction rotation moment.

By disposing an additional tilt prevention unit 240a instead of the guide piece 209, that is, by disposing two tilt prevention units 240a along the scanning direction S, the moving unit 200a can be prevented from tilting in both the clockwise direction and the counterclockwise direction.

In accordance with another embodiment, when the moving unit 200a moves in the direction A, the first pinion 220 receives a driving force from a driving source 250 such that the first pinion 220 rotates in the clockwise direction C and the unit frame 210 moves in the direction A along the guide member 117. In such embodiment, a rotation moment M on the unit frame 210 that is produced by the rotation of the first pinion 220 is partially or totally offset by an elastic force F (e.g. spring force) of the elastic member 245. As a result, the unit frame 210 can be prevented from tilting in the clockwise direction, and the amount (e.g., angle) of tilting that occurs can be significantly limited or reduced.

The modulus of elasticity of the elastic member 245 can be determined to produce an elastic force F of the elastic member 245 that can substantially or completely offset the rotation moment M.

In the above-described embodiments, the sliding friction member 244s is elastically pressed or pushed by the elastic member 245 to contact the second surface 118. In alternative embodiments, however, the elastic member 245 can be omitted and the sliding friction member 244a can be disposed to the unit frame 210 such that it is held to be stationary and in contact with the second surface 118 of the guide member 117. In such embodiments, the rotation moment M produced by the rotation of the first pinion 220 is partially or totally offset by a repulsive force that is produced between the sliding friction member 244a and the guide member 117 to prevent tilting.

Figure 5:
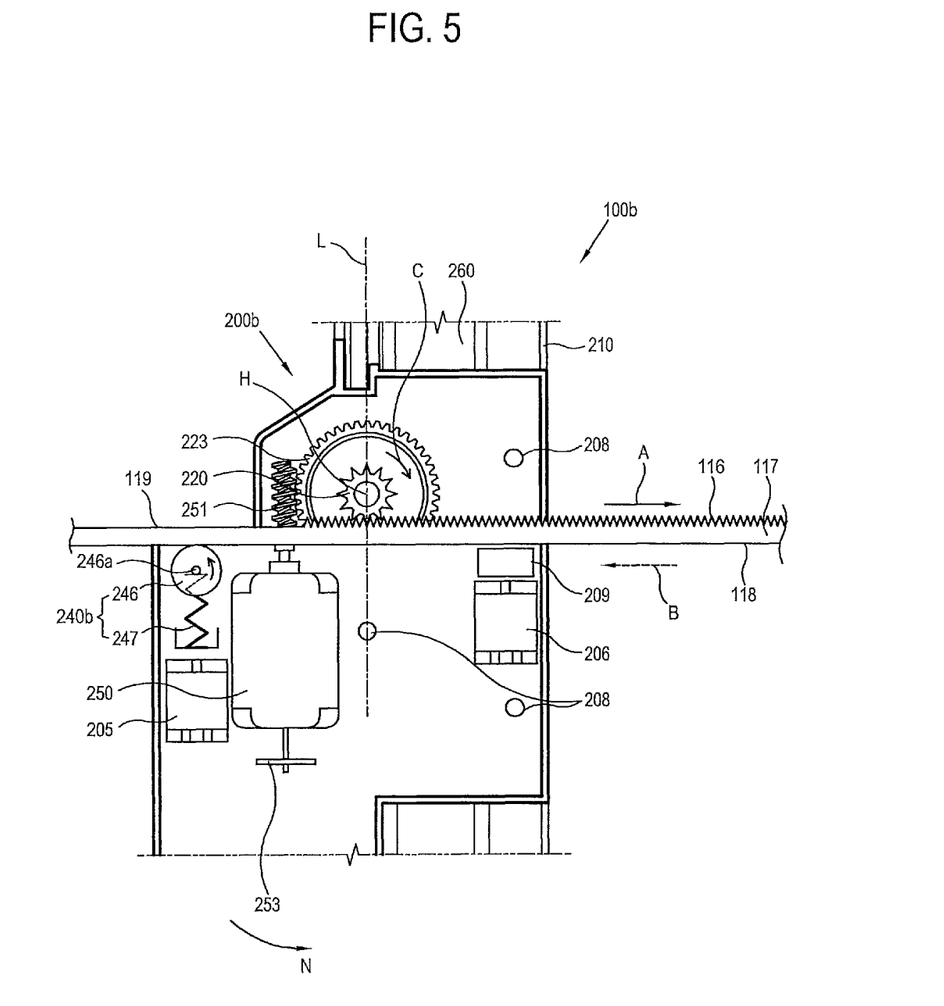
FIG. 5 is an enlarged view of a scanner, according to an embodiment.

As shown in FIG. 5, a scanner 100b according to another embodiment may include a guide member 117 and a moving unit 200b. The moving unit 200b includes a tilt prevention unit 240b. The tilt prevention unit 240b further includes a rolling friction member 246 and an elastic member 247.

The rolling friction member 246 is disposed on a unit frame 210 and is configured to contact the second surface 118 of the guide member 117. Moreover, the rolling friction member 246 is rotatably disposed on the unit frame 210 and is configured to rotate in a direction opposite the direction of rotation of the first pinion 220.

In this embodiment, the rolling friction member 246 can be made roll in the opposite direction to the rotation direction of the first pinion 220 by a driving source 250. The rolling friction member 246 can be configured to be idle when a driving force is not provided.

The rolling friction member 246 can be made of, for example, a thermosetting resin to reduce a friction resistance or friction force that can occur when the rolling friction member 246 is in contact with the guide member 117.

The elastic member 247 elastically presses or pushes a rotation shaft 246a of the rolling friction member 246 such that the rolling friction member 246 is moved in the direction of the guide member 117 and contacts the second surface 118 of the guide member 117. As a result of using the tilt prevention unit 240b, the rolling friction member 246 rotates in a direction opposite to the direction of rotation of the first pinion 220, and the rotation moment M that is exerted on the moving unit 200 by the rotation of first pinion 220 is offset, preventing the moving unit 200b from tilting.

As shown in FIG. 5, when the rolling friction member 246 is disposed in particular position such that the center point of the rotational shaft 246a of the rolling friction member 246 is positioned on or left of the plane L, the tilting that can occur on the moving unit 220b can be prevented by an elastic force F associated with the elastic member 247. This approach is similar to the approach described above with respect to the sliding friction member 244a in the previous embodiments in which the sliding friction member 244a is used to prevent the tilting of the moving unit 220b.

In the above-described embodiments, the rolling friction member 246 is elastically pressed or pushed by the elastic member 247 against the second surface 118 of the guide member 117. The elastic member 247, however, can be omitted and the rotation shaft 246a of the rolling friction member 246 can be rotatably disposed on the unit frame 210 at a predetermined and fixed position such that the rolling friction member 246 contacts the second surface 118 of the guide member 117. In such embodiment, the tilting of the moving unit 200b can be prevented by the rotation of the rolling friction member 246 or by a repulsive force produced between the rolling friction member 246 and the guide member 117 when the rolling friction member 246 is disposed to the left side of the plane L.

Figure 6:
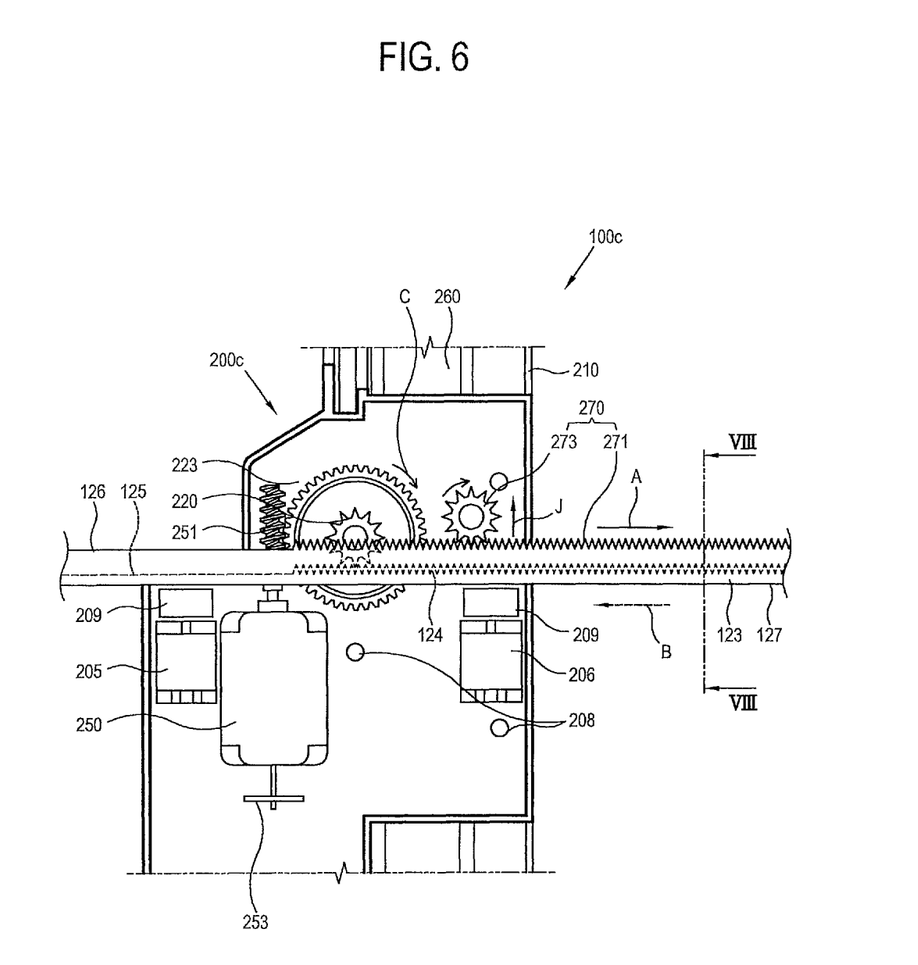
FIG. 6 is an enlarged view of a scanner, according to an embodiment.
Figure 7:
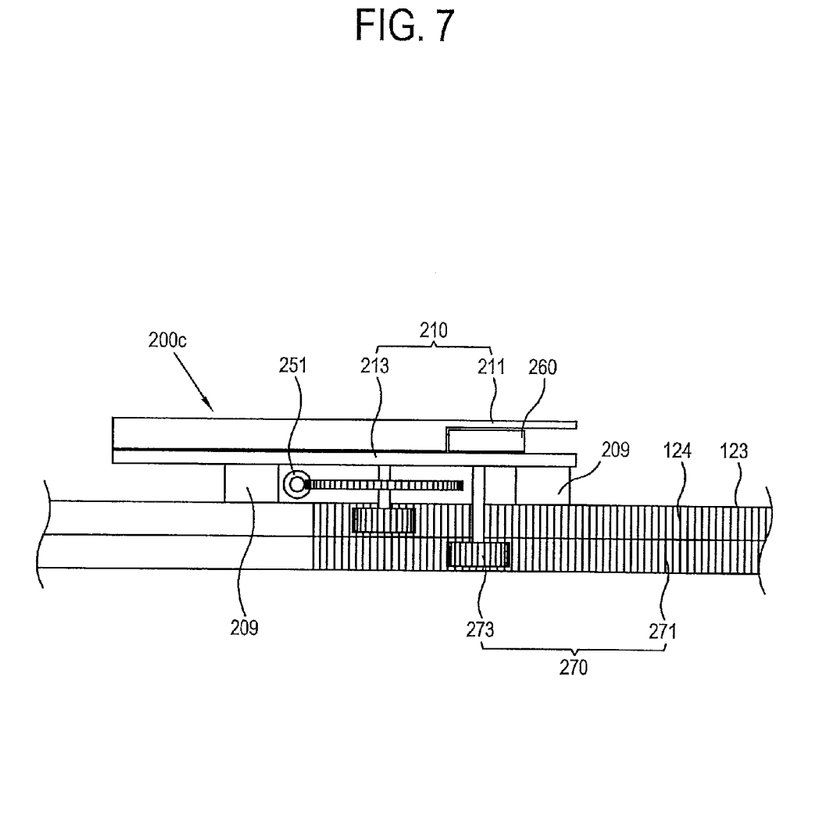
FIG. 7 is a side view of the scanner in FIG. 6.
Figure 8:
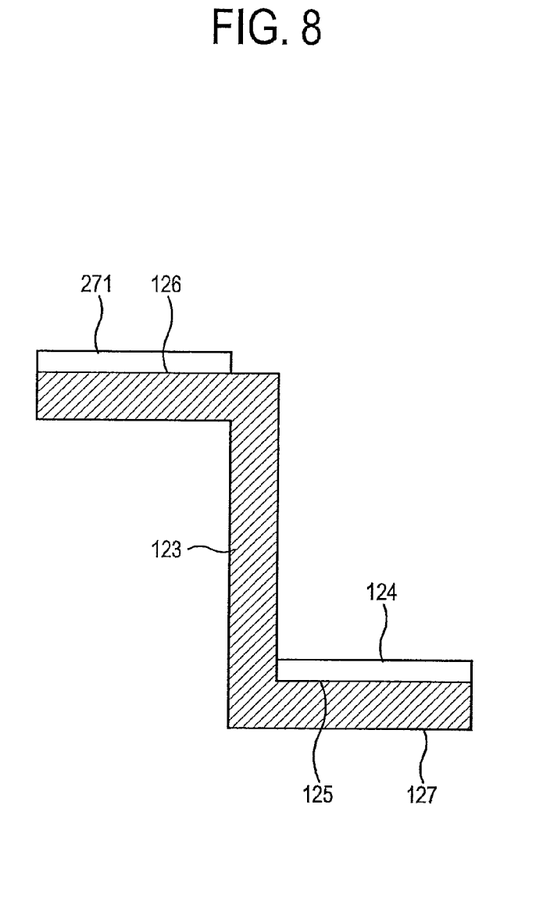
FIG. 8 is an enlarged sectional view taken along line VIII-VIII in FIG. 6.

As shown in FIGS. 6-8, a scanner 100c according to alternative embodiments may include a guide member 123 and a moving unit 200c. The guide member 123 extends in a scanning direction (direction S in FIG. 1), and includes a first surface 125 having a first rack 124 and a second surface 126 having a step or being offset with respect to the first surface 125. The guide member 123 is disposed on a main body frame (not shown) of the scanner 100c and is configured to be held stationary with respect to the main body frame.

The moving unit 200c includes the first pinion 220 and a tilt prevention unit 270. The first pinion 220 is configured to rotatably move along the first rack 124 and the tilt prevention unit 270 configured to prevent the tilting of the unit frame 210 that may result from the rotation of the first pinion 220. The tilt prevention unit 270 may include a second rack 271 on the second surface 126 of the guide member 123 and a second pinion 273 that is configured to rotatably move along the second rack 271. The second pinion 273 is rotatably disposed on the unit frame 210 and may be configured to remain idle in some instances.

A pair of guide pieces 209 may be disposed on the unit frame 210, and may be positioned such that there is a predetermined distance between the guide pieces 209 and a lower surface 127 of the guide member 123. The guide pieces 209 are configured to prevent the moving unit 200c from being separated from the guide member 123 (e.g., by moving in a downward direction with respect to the orientation as shown in FIG. 6).

The movement of the moving unit 200c along the guide member 123 is described below. When the first pinion 220 receives a driving force from the driving source 250 to rotate in a clockwise direction C, the unit frame 210 moves in the direction A (e.g., the forward direction). The second pinion 273 is disposed on the unit frame 210 and is engaged to the second rack 271. The second pinion 273 is configured to rotate in a clockwise direction. In such embodiment, the unit frame 210 is prevented from tilting by a repulsive force J that is produced between the second rack 271 and the second pinion 273.

In the above-described embodiment, the second rack 271 is on the second surface 126 of the guide member 123. Alternatively, the sliding friction member 244a and the elastic member 245 according to the earlier embodiments can be used in place of the second rack 271 and the second pinion 273 to prevent tilting.

In such embodiment, the elastic member 245 can elastically press or push the sliding friction member 244a in the direction of the guide member 123 such that the contact surface of the sliding friction member 244a and the second surface 126 of the guide member 123 contact each other. In this instance, the unit frame 210 can be prevented from tilting by an elastic force produced by the elastic member 245 and/or by a repulsive force produced between the sliding friction member 244a and the guide member 123.

Alternatively, the rolling friction member 246 and the elastic member 247 according to the earlier embodiments can be used in place of the second rack 271 and the second pinion 273. For example, the elastic member 247 can elastically press or push the rolling friction member 246 in the direction of the guide member 123 such that the rolling friction member 246 and the second surface 126 of the guide member 123 contact each other. In this instance, the unit frame 210 can be prevented from tilting by an elastic force produced by the elastic member 247 and/or by a repulsive force produced between the sliding friction member 246 and the guide member 123.

An image forming apparatus (not shown) according to an embodiment can include the scanner moving unit 200, 200a, 200b and 200c, the scanner 100, 100a, 100b and 100c, and a printing unit (not shown) configured to print an image scanned by means of the scanner 100, 100a, 100b and 100c on a printing medium.

The printing unit can be at least one of an ink jet type, a photoelectric type, a heat transfer type, and other known printing types. For example, a printing unit of the ink jet type can include an ink cartridge or an ink head. In another example, a printing unit of the photoelectric type can include an image carrying body and a light exposing unit. In yet another example, a printing unit of the heat transfer type can include a thermal printing head (TPH).

The image forming apparatus can be implemented as an electric copier or as a multifunction apparatus that includes at least one of the scanner 100, 100a, 100b, and 100c.

A scanner moving unit and an image forming apparatus according to the exemplary embodiments described above can produce one or more of the following results.

A moving object in a scanner can be prevented from substantially tilting by minimizing the amount (e.g., angle) of tilting. By limiting or preventing the amount of tilting that occurs, the quality of a scanned image can be improved when the moving object of the moving unit is a scanning module, and the quality of an ink image formed on a printing medium can be improved when the moving object is an ink cartridge.

A tilt prevention unit may be configured to take into consideration whether the motion occurs in relation to scanning a record image of a document or whether the motion occurs in relation to returning to an original position without scanning. Such consideration can be used to reduce the cost of the scanner. Cost can also be reduced by allowing components such as the first pinion and the first rack and the second pinion and the second rack to be made compatible and/or interchangeable.

While the disclosure has been particularly shown and described with reference to several embodiments thereof with particular details, it will be apparent to one of ordinary skill in the art that various changes may be made to these embodiments without departing from the principles and spirit of the invention, the scope of which is defined in the following claims and their equivalents.

What is claimed is:

1. An operating method of a scanner comprising a scanning unit, a movable unit on which the scanning unit is mounted and on which a first pinion and a second pinion are disposed, and a stationary guide member, the method comprising:
   moving the first pinion along a first rack of a first surface of the stationary guide member; and
   limiting an amount of a tilting of a moving object in the scanning unit,
   wherein the limiting comprises transferring a rotation force, which is generated when the first pinion moves, to the second pinion, and moving the second pinion along a second rack of a second surface of the stationary guide member, which is different from the first surface thereof, such that a direction of rotation of the second pinion is opposite to a direction of rotation of the first pinion.

2. The method according to claim 1, wherein the moving the second pinion comprises rotating such that a second rotational moment caused by the rotation of the second pinion has a same magnitude and is opposite in direction to a first rotational moment caused by the rotation of the first pinion.

3. The method according to claim 1, wherein the first pinion and the second pinion have substantially a same pitch.

4. The method according to claim 1, wherein the first surface and the second surface of the guide member are opposite from each other.

5. The method according to claim 1, further comprising generating a driving force to rotate at least one of the first pinion and the second pinion.

6. The method according to claim 1, wherein at least one of the first pinion and the second pinion includes a helical gear.

7. The method according to claim 1, wherein a rotation force is transferred from the first pinion to the second pinion by an idle gear.

8. An operating method of an image forming apparatus comprising a scanner having a scanning unit, a movable unit on which the scanning unit is supported and on which a first pinion and a second pinion are rotatably disposed, a stationary guide member, and an image forming unit configured to reproduce an image scanned by the scanning unit on a printing medium, the method comprising:
   moving the first pinion along a first rack of a first surface of the stationary guide member; and limiting an amount of a tilting of a moving object in the scanning unit,
wherein the limiting comprises transferring a rotation force, which is generated when the first pinion moves, to the second pinion, and moving the second pinion along a second rack of a second surface of the stationary guide member, which is opposite to the first surface thereof, such that a direction of rotation of the second pinion is opposite to a direction of rotation of the first pinion.

9. A method for limiting an amount of a tilting of a moving object in a scanning unit, comprising:
rotating a first pinion in a first direction to move with the scanning unit along a first rack of a first surface of a stationary guide member;
transferring a rotation force, which is generated when the first pinion rotates, to a second pinion; and
rotating the second pinion in a second direction opposite to the first direction to move with the scanning unit along the first rack of the first surface of the stationary guide member.

10. The method according to claim 9, wherein the rotation force is transferred from the first pinion to the second pinion by an idle gear.

11. A method for limiting an amount of a tilting of an object moving in a unit, the method comprising:
transferring a force, which is generated when a first gear moves along a first surface of a guide member on which the moving object is disposed, to a second gear; and
moving the second gear along a second surface of the guide member such that a direction of a rotation of the second gear is opposite to a direction of a rotation of the first gear.

* * * * *